United States Patent [19]

Müller et al.

[11] 4,242,889
[45] Jan. 6, 1981

[54] COUPLING FOR TORQUE TRANSMISSION

[75] Inventors: Helmut Müller; Heinz Schweizer, both of Heidenheim, Fed. Rep. of Germany

[73] Assignee: Voith Transmit GmbH, Fed. Rep. of Germany

[21] Appl. No.: 902,701

[22] Filed: May 4, 1978

[30] Foreign Application Priority Data

May 12, 1977 [DE] Fed. Rep. of Germany ....... 2721306
Mar. 23, 1978 [DE] Fed. Rep. of Germany ....... 2812783

[51] Int. Cl.³ .............................................. F16D 7/02
[52] U.S. Cl. ...................................... 64/30 R; 64/1 C; 64/9 R
[58] Field of Search .................. 64/9 R, 30 R, 30 E, 64/1 C

[56] References Cited

U.S. PATENT DOCUMENTS

| 101,940 | 4/1870 | Tatham | 64/30 R |
|---|---|---|---|
| 715,298 | 12/1902 | Roberts | 64/30 R |
| 1,196,268 | 8/1916 | Noel | 64/9 R |
| 1,630,544 | 5/1927 | Smith et al. | 64/9 R |
| 1,708,378 | 4/1929 | Dale | 64/30 R |
| 2,551,735 | 5/1951 | Goff | 64/9 R |
| 2,914,929 | 12/1959 | Irons | 64/9 R |
| 3,557,574 | 1/1971 | Avery | 64/9 R |

Primary Examiner—Ira S. Lazarus
Attorney, Agent, or Firm—Ostrolenk, Faber, Gerb & Soffen

[57] ABSTRACT

A coupling having two coupling members with engaging faces; each face has a plurality of annular, concentric ribs of trapezoidal cross-section and grooves correspondingly shaped to receive the ribs on the other face; less than the entire contact area of each face is ribbed; a spigot on one in a recess coupling member is received for initially positioning the coupling members; devices for clamping the coupling members together.

29 Claims, 5 Drawing Figures

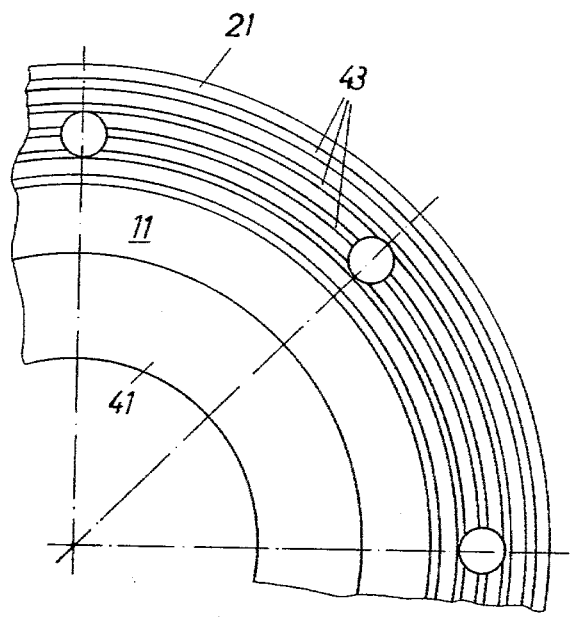
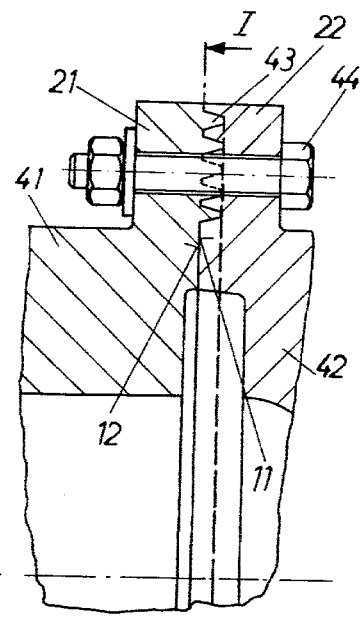
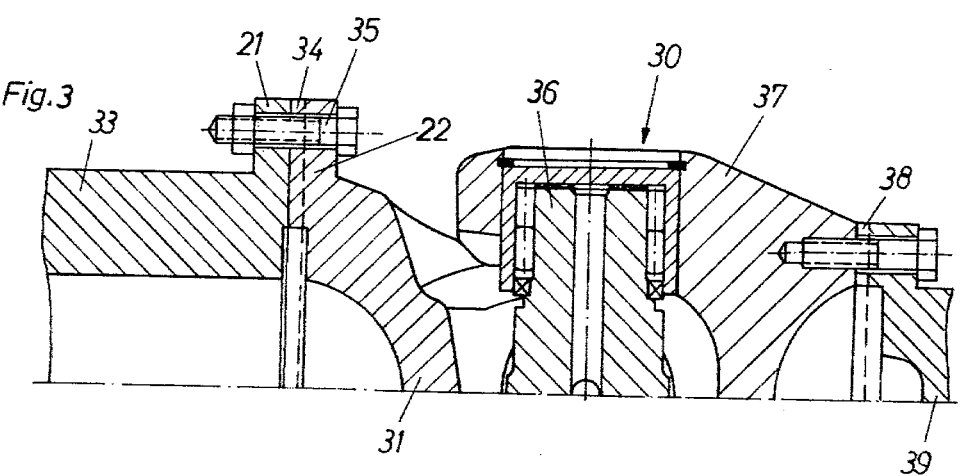

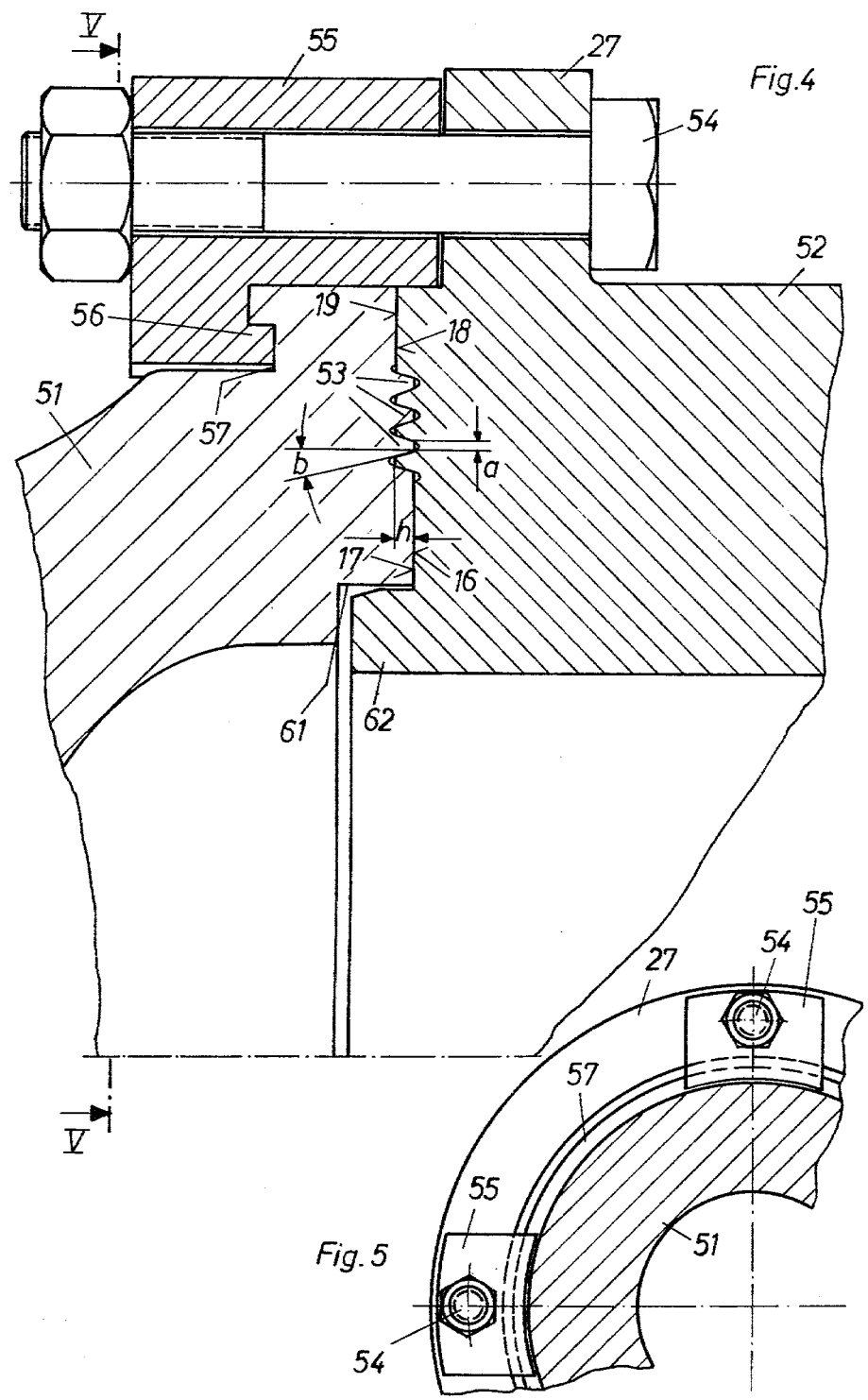

COUPLING FOR TORQUE TRANSMISSION

BACKGROUND OF THE INVENTION

1. Field of the Invention

The invention relates to couplings for rigidly connecting two substantially coaxial machine elements, such as two shafts, for example, and which coupling is particularly suitable for transmitting torque. The coupling comprises two coupling members whose adjacent faces are clamped against each other.

2. Description of the Prior Art

Flange couplings are examples of known couplings of this kind. In these, the coupling members are formed as flanges with flat faces that are arranged normal to the axis of rotation and that press against each other. The coupling members are clamped together by bolts or similar connecting devices. The transmission of torque is effected purely by friction-locking, produced by tensile loading of the bolts. The torque which can be transmitted by these couplings is restricted when, due to lack of space, the flanges cannot be constructed as large as necessary.

It is known, e.g. from German Patent No. 1,066,818, to use tapered bores for attaching wheels, discs and the like to a shaft. Friction-locking couplings with complementary cone shaped friction surfaces are also known. It is known that is this type of coupling, where the coupling members press against each other via cone shaped faces instead of via flat faces, there is an increase in the clamping force exerted, so that greater torque can be transmitted. However, cone shaped clamping surfaces have the disadvantage that they may require a great deal of space in the axial direction. In addition, cone shaped complementary surface are expensive to produce as they have to be machined very accurately.

For these reasons, many other types of couplings are known in which other means are used to increase the torque which can be transmitted. For example, fitted bolts may be used and they may be inserted between the faces of the coupling members (see the journal "Konstruktion 1977", page 427, left-hand column), radial serrations may be formed (see German Patent No. 440,816), or tapered pins may be arranged to point in the radial direction between the coupling members (see German Patent No. 1,450,160). By any of these means, the friction-locking connection is supplemented or replaced by a form-locking connection. Couplings of this type are similarly expensive to produce. Some of these known couplings are also sensitive to impact or fluctuating torque, especially the coupling with a key. A coupling with radial serrations has the disadvantage that it produces a high axial thrust when transmitting torque.

In another known type of form-locking coupling (see German Patent No. 635,207), spiral ribs and grooves which engage in each other are machined in the faces of the flanges.

Moreover, other proposals have recently been made for form-locking couplings, especially for linking a universal jointed shaft with the shafts adjoining it. According to German Laid-Open Specification No. 25 54 574, the flanges of a flanged coupling have several groups of parallel teeth which mutually engage in each other. According to German Utility Model No. 77 05 744, the contact surfaces of the two flanges of a coupling lie in a plane which is determined by the axis of rotation. These proposals also have the disadvantage of high production costs.

In addition, it is common to all types of form-locking couplings that the coupling members cannot be assembled in any random position. They must first be brought into the correct relationship by rotating one member relative to the other.

SUMMARY OF THE INVENTION

An object of the invention is to provide a coupling of the type discussed above which is of simple and compact construction and which is suitable for transmitting high and/or fluctuating torques.

Another object of the invention is to enable such a coupling to be assembled without the coupling members having to be in particular rotative positions.

The invention concerns a coupling for rigidly mounting two substantially coaxial machine elements, such as two shafts, which are suitable for transmitting torque. It uses two coupling members with faces which engage each other and which can be clamped together by connecting devices. Several circular or annular ribs with angled side faces are provided on the face of at least one of and preferably on the faces of both of the coupling members. The ribs are arranged concentrically with the axis of the coupling. The ribs are adapted to engage in corresponding grooves on the other coupling member. The grooves are preferably profiled to mate with the ribs they receive. Where ribs are placed on both coupling member faces, the ribs on one face are radially offset from the ribs on the other face, so that the ribs on each face can be received in the grooves defined between the ribs on the other face.

The lateral surfaces of the ribs are tapered so that, taken as a whole, many conical clamping surfaces, concentric to the axis of the coupling, are created. Unlike known couplings which have a single large conical clamping surface, in the coupling according to the invention all of the small (viewed in longitudinal section) conical clamping surfaces take up only a very short space in the axial direction.

When the invention was contemplated, it was feared that, if the normal dimensional tolerances were permitted for the ribs and grooves, when the two coupling members were placed in contact, only some of the conical clamping surfaces would come into contact with each other. It was believed that the contact between the conical clamping surfaces which is necessary for reliable transmission of the required torque could only be achieved by very accurate and therefore costly machining of the ribs and grooves.

However, according to the invention it was realized that provided that the dimensional tolerances are kept within reasonable limits, the cross-sections of the ribs and grooves can be made in such a way that when the coupling members are assembled together and clamped, the ribs could be deformed at least elastically. Under certain conditions, when the coupling is assembled for the first time, permanent deformation of the ribs may even be possible. In this way, the requirements for accuracy in production can be realized, while production costs can be kept within reasonable bounds.

When the invention was contemplated, it was also feared that it would be necessary to increase the axial bolting force for possible deformation of the ribs, and that the number of bolts required would increase. This would be a disadvantage because the coupling should have the smallest number of bolts possible so that it can be dismantled and re-assembled quickly, if required. In other words, it should be possible to use the coupling as a quick-release coupling. This additional requirement can be fulfilled by the specialized dimensioning of the ribs, which is described in detail below. The ribs and grooves are made with a particularly small cross-sectional area and with a relatively slender transverse profile. In this way, a favorable relationship between the axial bolting force required and the torque which can be transmitted is achieved.

Furthermore, it is particularly favorable if the number of concentric ribs and grooves is limited, i.e. fewer ribs and grooves are actually provided than could be accommodated on the faces of the two coupling members, whereby parts of the engaging faces are rib free.

With the combined features described above, two different advantages can be achieved simultaneously. On the one hand, when the two coupling members are assembled, if deformation of the ribs is necessary, the resistance to deformation is relatively slight so that a small number of clamping bolts is sufficient. On the other hand, production is facilitated, not only because, as already described, normal dimensional tolerances can be employed, but also because only a small amount of material has to be machined away to form the ribs and grooves in the faces of the coupling member.

With the invention the cross-sectional dimensions of the ribs and grooves can be made the same for all sizes of couplings, so that as the size of the coupling increases, it is only necessary to increase the number of the ribs and grooves. This also has the advantage that the ribs and grooves for couplings of different sizes can be produced with the same tooling.

It is particularly expedient to provide the ribs and grooves only in the region of the mean radius of the coupling member faces which transmit the torque. These surfaces are generally circular. In this way, it is possible to buttress the outermost and innermost ribs with "supporting" material, i.e. by regions of the coupling flange which are not weakened by grooves.

A coupling according to the invention is a fatigue-resistant, play-free, clamped coupling without form-locking, i.e. the transmission of torque is effected purely by friction-locking. The coupling is, therefore, capable of sustaining large fluctuating torques. At the same time, the specific flank angle of the conical clamping surfaces enables the coupling to be released without exerting undue effort. This is a further important requirement for use of the coupling as a quick-release coupling.

All of the ribs and grooves on a coupling member may be machined simultaneously with a single tooling set up. This enables the same tooling to be used for both coupling members.

A coupling according to the invention may be used to link very heavy machine parts. For example, in the drive of a rolling mill, it may be used as a quickrelease coupling. In this case, it is inconvenient if, upon assembly of the coupling, one of the machine elements has to be rotated with respect to one of the coupling members until the bolt holes for the clamping bolt in both coupling members coincide. Instead, bolt holes are provided in only one coupling member, while the other coupling member carries a separated, movable flange which can be positioned to coincide with the bolt holes in the other member. The use of several loose flange segments has an advantage compared with a single loose flange (except that it is heavier) that the flange segments can be removed from the coupling, after the machine elements that were coupled have been separated. A further advantage of this construction is that with an extremely high, impact-type torque the coupling can act as a safety overload slip coupling.

It is particularly advantageous to use a coupling according to the invention to link a universal coupling with a machine element adjoining it which is used to pass on the transmitted torque. Preferably, in this case, the parts involved form part of an articulated shaft intended to drive heavy machinery, such as a rolling mill, for example. In this instance, particularly high and fluctuating torques have to be transmitted in confined spaces. As is known, an articulated shaft can include two universal couplings with a telescopic shaft arranged between them for the necessary length equalization. The aim with an articulated shaft provided for the aforesaid purpose is to optimize all the powertransmitting components, particularly the fork ends, the cross and yoke and the splined region of the telescopic shaft so that they all have the same fatigue resistance. In known articulated shafts, one weak element in this "chain" is the connections between the fork ends and the shaft elements of the telescopic shaft. These have been made until now by welding or as conventionally-constructed flange couplings. Another weak element is the connection between the articulated shaft and the machine element which is to be driven by it, such as the drive pins or a roller, for example. If couplings according to the present invention are used for these connections, then it is possible for these connections to be designed to have the same fatigue resistance as the other components of the articulated shaft, without having to exceed a predetermined maximum permissible external diameter.

Other objects and features of the invention will be readily understood from the following description of the accompanying drawings.

BRIEF DESCRIPTION OF THE DRAWINGS

FIG. 1 is an elevational view of a fragment of one coupling member of a coupling according to the invention, viewed in the direction of the arrow I in FIG. 2.

FIG. 2 is a view of a fragment of the coupling in partial longitudinal section.

FIG. 3 is a partial longitudinal section through the cross and yoke coupling of an articulated shaft and provided with two couplings according to the invention.

FIG. 4 is a partial longitudinal section through a modified form of coupling according to the invention.

FIG. 5 is a cross-section along the line V—V in FIG. 4, shown in a smaller scale than FIG. 4.

DESCRIPTION OF THE PREFERRED EMBODIMENTS

FIGS. 1 and 2 show a first coupling member 41 and a second coupling member 42 of a coupling constructed according to the invention. The two coupling members have respective radially outer coupling flanges 21, 22. The respective opposed faces 11, 12 of the respective flanges 21, 22 engage each other in the assembled state. The face 11 of flange 21 has ribs 43, which engage in correspondingly shaped grooves which are machined into the face 12 of the flange 22. The ribs 43 and the corresponding grooves are circular and are concentric with the axis of the coupling. The ribs 43 can be dimensioned as described below in conjunction with FIGS. 4 and 5.

As illustrated, face 12 has its own ribs having the characteristics of the ribs on face 11. But, the ribs on faces 11 and 12 are radially offset, whereby adjacent ribs an each face define a groove in which an offset rib from the other face is received.

Bolts 44 pass through aligned openings in flanges 21 and 22 for mutually clamping the two coupling members.

The lateral surfaces of the ribs and the cooperating grooves are at an oblique angle to the axis of the coupling so that the cross-section of each rib tapers in a V-shape. In cross-section, each rib is trapezoidal in shape, with various dimensions described below. This coupling can therefore be called a "V-coupling". Preferably, the angle of tilt of the lateral surfaces from the axis of the coupling will be the same on both side surfaces of every rib.

As shown in FIGS. 1 and 2, ribs 43 and the corresponding grooves occupy only slightly more than half the surface areas of the contacting surfaces of the circular faces 11, 12. In particular, they occupy about 60 percent of these surface areas. The ribs and grooves occupy the outermost region of the faces 11, 12. Preferably, the average width of the projecting ribs 43 on one coupling member 41 is the same as the average width of the projecting ribs on the other coupling member 42 which ribs project into the grooves on the first mentioned coupling member.

FIG. 3 shows an application for the coupling according to the invention to an articulated shaft. Only one of the two cross and yoke couplings 30 of this example is shown in FIG. 3. The cross and yoke coupling 30 comprises a first fork end 31 with a coupling flange. Flange 22 is connected to a hollow shaft 33 by a coupling flange 21 on the shaft 33. The coupling further comprises a crosspiece 36 and a second fork end 37 which is connected to the end 39 of a telescopic shaft. The coupling flanges 21 and 22 are constructed as a V-coupling, like that shown in FIGS. 1 and 2, with circular, concentric ribs and grooves, which are indicated schematically at 34, and with clamping bolts 35. The connection between the fork end 37 and the telescopic shaft 39 is similarly formed as a V-coupling. At this coupling, there are similar concentric ribs and grooves which are shown schematically at 38.

The V-coupling shown in FIGS. 4 and 5 is an improvement over the embodiment shown in FIGS. 1 and 2. The coupling again comprises two coupling members 51 and 52, whose opposed faces 16, 17 and 18, 19 engage with each other. Only one coupling member 52 has a coupling flange 27 through which the clamping bolts 54 are inserted. There are four such bolts in this example. Unlike the embodiment of FIGS. 1 and 2, the coupling flange 27 is not part of the region of the coupling member faces which engage each other to transmit the torque. The flange 37 serves only for the application of the axial bolting force. On the other coupling member 51, there is a respective loose flange segment 55 for each clamping bolt 54. The flange segment has a bolt receiving hole passing through it. A single annular, loose flange could be provided instead of the separate flange segments 55. On its inner periphery, each flange segment 55 has a projection 56 which engages in a cooperatingly shaped annular groove 57 on the coupling member 51. This secures the flange segments 55 against moving out under centrifugal force.

The circular, concentrically arranged ribs 53 on the face of coupling member 51 and the corresponding grooves on coupling member 52 occupy only about a third of the surface of the faces 16, 17 and 18, 19 which serve to transmit the torque. They are arranged about, i.e. radially inwardly and outwardly, the mean radius of the entire face. This prevents the outermost rib, for example, from being forced outward as the coupling is clamped, which could occur under certain circumstances with the embodiment of FIGS. 1 and 2.

It has been found that the dimensions of the cross-sections of the ribs can be made the same in couplings of different sizes. The width a at the top of the rib can be in the range of 1 to 5 mm, and preferably in the range of 2 to 3 mm, the height h of the rib off the face of the coupling member in the range of 2 to 10 mm, and preferably in the range of 3 to 5 mm, and the flank angle b of each sidewall of the rib in the range of 8° to 16° with respect to the axis of the coupling, and preferably in the range of 10° to 12°. The number of ribs 53 is increased correspondingly as the radial size of the coupling increases.

As shown in FIG. 4, production of the coupling is facilitated if the regions 16 and 17 of the face, which lie radially inside the ribs 53, are offset along the axis of the coupling by the height h of the ribs from the regions 18 and 19 of the faces, which lie radially outside the ribs. It is also advantageous to provide a recess 61 in one of the coupling members and to provide a spigot 62 on the other coupling member which fits in the recess with a great deal of play. This enables preliminary centering of the coupling members when they are being assembled together. The spigot 62 is chamfered to facilitate the introduction of the spigot 62 into the recess 61.

In the first embodiment, the ribs are recited as extending over about 60 percent of the surface areas of the contact area of the face of the coupling flange and in the second embodiment, the ribs are recited as occupying about one-third of the contact areas of the engaging faces. Depending upon the needs of a particular embodiment, the ribs may cover in the range of 20–60 percent of the surface areas of the contact areas of the clamped together faces of the coupled elements, and preferably cover in the range of 25 to 40 percent of the surface areas.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A coupling for rigidly connecting two substantially coaxial machine elements, for transmitting torque, comprising:
   said coupling having an axis;
   a first coupling member having a first face; a second coupling member having a second face; said first and said second faces in engagement;
   a plurality of annular ribs formed on said first face; a corresponding plurality of annular grooves formed on said second face; said ribs and said grooves being circular in shape around their respective said faces; said ribs and said grooves being so placed and shaped such that each said rib engages in a respective corresponding said groove.

2. The coupling of claim 1, wherein each said face has an inner rib free region radially inwardly of said ribs and has an outer rib free region radially outwardly of said ribs;
    said inner rib free region being offset with respect to said outer rib free region along said axis of said coupling.

3. The coupling of claim 2, wherein the offset of said face regions is a distance measured by the height of said rib.

4. The coupling of claim 1, wherein said faces have respective contact areas at which they are in contact; said ribs occupy in the range of 20 to 60 percent of the surface areas of said contact areas of said faces.

5. The coupling of claim 1, wherein both said faces have a plurality of said ribs and have a plurality of said grooves, with said ribs on each said face being radially offset from said ribs on the other said face, thereby also defining each said groove on each said face between neighboring said ribs on that said face.

6. The coupling of claim 1, wherein each said rib is trapezoidal in cross-section.

7. The coupling of claim 1, further comprising means for clamping said first and said second faces together.

8. The coupling in claim 7, further comprising a chamfered spigot on one said coupling member and facing toward the other said coupling member, and a recess for said spigot on the other said coupling member, with a large amount of play being provided between said spigot and said recess therefor.

9. The coupling of claim 1, wherein said ribs have respective side faces, which are angled obliquely to said axis of said coupling.

10. The coupling of claim 9, wherein said ribs and said grooves of said plurality thereof are all concentric with said axis of said coupling.

11. The coupling of any of claims 5, 9 or 10, wherein each said rib has a cross-sectional shape above the surface of said first face, wherein each said rib has a top with a radial width in the range of 1 to 5 mm, a height off the surface of said first face in the range of 2 to 10 mm, and a flank angle for its said side walls, with respect to said axis of said coupling, in the range of 8° to 16°.

12. The coupling of claim 11, further comprising means for clamping said first and said second faces together.

13. The coupling of claim 12, wherein said coupling members have peripheries; said clamping means being located radially outside said periphery of said first coupling member; said clamping means including a clampable element on said second coupling member;
    a loose separate flange supported on said first coupling member;
    a fastening element extending from said loose flange to said clampable element for securing said flange and said clampable element together, thereby clamping said faces together.

14. The coupling of claim 13, further comprising a chamfered spigot on one said coupling member and facing toward the other said coupling member, and a recess for said spigot on the other said coupling member, with a large amount of play being provided between said spigot and said recess therefor.

15. The coupling of claim 11, wherein said rib top radial width is in the range of 2 to 3 mm, said rib height is in the range of 3 to 5 mm and said rib side wall flank angle is in the range of 10 to 12 mm.

16. The coupling of claim 11, wherein both said faces have a plurality of said ribs and have a plurality of said grooves, with said ribs on each said face being radially offset from said ribs on the other said face, thereby also defining each said groove on each said face between neighboring said ribs on that said face.

17. The coupling of claim 11, wherein each said rib is trapezoidal in cross-section.

18. The coupling of claim 11, wherein said faces have respective contact areas at which they are in contact; said ribs occupy in the range of 20 to 60 percent of the surface areas of said contact areas of said faces.

19. The coupling of claim 18, wherein said ribs occupy in the range of 25 to 40 percent of the surface areas of the contact areas of said faces.

20. The coupling of claim 18, further comprising means for clamping said first and said second faces together.

21. The coupling of claim 18, wherein each said face has an inner rib free region radially inwardly of said ribs and has an outer rib free region radially outwardly of said ribs;
    said inner rib free region being offset with respect to said outer rib free region along said axis of said coupling.

22. The coupling of claim 18, wherein said ribs are arranged to be radially located about the mean radius of said faces.

23. The coupling of claim 22, wherein each said face has an inner rib free region radially inwardly of said ribs and has an outer rib free region radially outwardly of said ribs;
    said inner rib free region being offset with respect to said outer rib free region along said axis of said coupling.

24. The coupling of claim 22, wherein both said faces have a plurality of said ribs and have a plurality of said grooves, with said ribs on each said face being radially offset from said ribs on the other said face, thereby also defining each said groove on each said face between neighboring said ribs on that said face.

25. The coupling of claim 24, wherein the said ribs on both said faces have the same dimensions.

26. The coupling of claim 24, wherein each said rib is trapezoidal in cross-section.

27. The coupling of claim 24, wherein each said face has an inner free region radially inwardly of said ribs and has an outer rib free region radially outwardly of said ribs;
    said inner rib free region being offset with respect to said outer rib free region along said axis of said coupling.

28. The coupling of claim 27, further comprising means for clamping said first and said second faces together.

29. The coupling of claim 27, wherein the offset of said face regions is a distance measured by the height of said rib.

* * * * *